(12) United States Patent
Wang et al.

(10) Patent No.: US 9,350,803 B2
(45) Date of Patent: May 24, 2016

(54) INFORMATION MANAGEMENT METHOD AND DEVICE

(71) Applicant: Tencent Technology (Shenzhen) Company Limited, Shenzhen (CN)

(72) Inventors: Xuxin Wang, Shenzhen (CN); Jianhui Yao, Shenzhen (CN); Xianwen Chen, Shenzhen (CN); Wen Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 267 days.

(21) Appl. No.: 14/080,719

(22) Filed: Nov. 14, 2013

(65) Prior Publication Data

US 2014/0075046 A1 Mar. 13, 2014

Related U.S. Application Data

(63) Continuation of application No. PCT/CN2013/083309, filed on Sep. 11, 2013.

(30) Foreign Application Priority Data

Sep. 13, 2012 (CN) .......................... 2012 1 0338451

(51) Int. Cl.
  *H04L 29/08* (2006.01)
  *A63F 13/34* (2014.01)
  *A63F 13/79* (2014.01)

(52) U.S. Cl.
  CPC .............. *H04L 67/104* (2013.01); *A63F 13/34* (2014.09); *A63F 13/79* (2014.09); *H04L 67/1095* (2013.01); *H04L 67/24* (2013.01)

(58) Field of Classification Search
  CPC ... H04L 67/104; H04L 67/1095; H04L 67/24; H04L 43/00; H04L 29/0854; H04L 29/08306; A63F 13/34; A63F 13/12; A63F 13/79
  USPC ......... 709/201, 203, 224, 220–222, 227–229, 709/237, 248
  See application file for complete search history.

(56) References Cited

U.S. PATENT DOCUMENTS 7,966,285 B2 * 6/2011 Sawadsky ......... G06F 17/30581
                                                       707/610

(Continued)

FOREIGN PATENT DOCUMENTS

CN  1992705 A    7/2007
CN  101815084 A  8/2010

(Continued)

OTHER PUBLICATIONS

Tencent Technology, IPRP, PCT/CN2013/083309, Mar. 17, 2015, 5 pgs.
Tencent Technology, ISRWO, PCT/CN2013/083309, Dec. 26, 2013, 10 pgs.

*Primary Examiner* — Kenneth R Coulter
(74) *Attorney, Agent, or Firm* — Morgan, Lewis & Bockius LLP (57) ABSTRACT

The current invention discloses methods and devices that may be used to maintain continued synchronization during a P2P session when a synchronizing terminal withdraws from synchronizing the operations of one or more participating terminals. A server may temporarily replace the synchronizing terminal and request operating status information from the participating terminals. After calculating data differences between the participating terminals using the operating status information, the server may transmit the data differences to the participating terminals so that each participating terminal is configured to synchronize itself with the other participating terminals. A new synchronizing terminal is selected from the participating terminals so that the new synchronizing terminal is configured to synchronize the operations of the remaining participating terminals. The current invention prevents termination of network applications due to the withdrawal of the synchronizing terminal, maintaining synchronization and improving the quality of the network applications.

24 Claims, 7 Drawing Sheets

(56) References Cited

U.S. PATENT DOCUMENTS

| | | | |
|---|---|---|---|
| 8,631,161 B2 * | 1/2014 | Lavrov | G06F 17/30241 709/248 |
| 2008/0243944 A1 * | 10/2008 | Sawadsky | G06F 17/30581 |
| 2009/0043867 A1 | 2/2009 | Sharp et al. | |
| 2010/0082842 A1 | 4/2010 | Lavrov et al. | |
| 2011/0038362 A1 | 2/2011 | Vos et al. | |

FOREIGN PATENT DOCUMENTS

| | | |
|---|---|---|
| CN | 102404387 A | 4/2012 |
| CN | 102469123 A | 5/2012 |
| JP | 2012078901 A | 4/2012 |

* cited by examiner

INFORMATION MANAGEMENT METHOD AND DEVICE

RELATED APPLICATIONS

This application is a continuation application of PCT Patent Application No. PCT/CN2013/083309, entitled "Information Management Method and Device" filed on Sep. 11, 2013, which claims priority to Chinese Patent Application No. 201210338451.7, "Information Management Method and Device," filed on Sep. 13, 2012, both of which are hereby incorporated by reference in their entirety.

FIELD OF THE INVENTION

The present invention generally relates to information management methods and devices, in particular to network application method and devices involving maintenance of data synchronization.

BACKGROUND OF THE INVENTION

With the development of modern network technology, users are no longer satisfied to use unconnected computers for work and/or entertainment. In general, users prefer more interaction and communication during work and/or play, relying heavily on the internet and other network technologies.

The existing technology uses a number of terminals to carry out certain peer-to-peer (P2P) services. During a P2P session, one of the terminals is used as a synchronizing terminal and the others are used as participating terminals. The synchronizing terminal serves as a "host computer" for the P2P service and it is responsible for coordinating the operation of the participating terminals. In particular, the synchronizing terminal manages the operating logic frame values and user input sets of the participating terminals, enabling all the terminals, which are located in different places, to synchronize their functions and facilitate the information exchange during the P2P session.

The existing technology, however, presents certain deficiencies: when the synchronizing terminal withdraws either intentionally or accidentally, the participating terminals are forced to discontinue and the P2P program is forced to terminate, making user experience unsatisfying.

SUMMARY

The above deficiencies and other problems associated with the existing technology are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer system. The computer system detects communication status of a synchronizing terminal, wherein the synchronizing terminal is configured to synchronize the operations of one or more participating terminals. The computer system requests operating status information corresponding to each participating terminal from the participating terminals when the communication status of the synchronizing terminal meets a predetermined condition. The computer system also receives the corresponding operating status information uploaded by the participating terminals and calculates data differences between the participating terminals based on the operating status information corresponding to each participating terminal. In some embodiments, the computer system transmits the data differences to the participating terminals, respectively, such that each participating terminal is configured to synchronize itself with the other participating terminals using the data differences. Finally, the computer system selects a new synchronizing terminal from the participating terminals based on a set of pre-determined rules after receiving signals from the participating terminals indicating completion of synchronization, so that the new synchronizing terminal is configured to synchronize the operations of the remaining participating terminals.

Another aspect of the invention involves a computer system. The computer system includes memory, one or more processors, and one or more programs modules stored in the memory and configured for execution by the one or more processors. The one or more program modules include: a detecting module configured to detect communication status of a synchronizing terminal, wherein the synchronizing terminal is configured to synchronize the operations of one or more participating terminals; a requesting module configured to request operating status information corresponding to each participating terminal from the participating terminals when the communication status of the synchronizing terminal meets a predetermined condition; a receiving module configured to receive the corresponding operating status information uploaded by the participating terminals; a processing module configured to calculate data differences between the participating terminals based on the operating status information corresponding to each participating terminal; a transmission module configured to transmit the data differences to the participating terminals, respectively, such that each participating terminal is configured to synchronize itself with the other participating terminals using the data differences; and a selection module configured to select a new synchronizing terminal from the participating terminals based on a set of pre-determined rules after receiving signals from the participating terminals indicating completion of synchronization, so that the new synchronizing terminal is configured to synchronize the operations of the remaining participating terminals.

Another aspect of the invention involves a non-transitory computer readable storage medium having stored therein instructions, which when executed by a computer system cause the computer system to: detect communication status of a synchronizing terminal, wherein the synchronizing terminal is configured to synchronize the operations of one or more participating terminals; request operating status information corresponding to each participating terminal from the participating terminals when the communication status of the synchronizing terminal meets a predetermined condition; receive the corresponding operating status information uploaded by the participating terminals and calculates data differences between the participating terminals based on the operating status information corresponding to each participating terminal; transmit the data differences to the participating terminals, respectively, such that each participating terminal is configured to synchronize itself with the other participating terminals using the data differences; and select a new synchronizing terminal from the participating terminals based on a set of pre-determined rules after receiving signals from the participating terminals indicating completion of synchronization, so that the new synchronizing terminal is configured to synchronize the operations of the remaining participating terminals.

Some embodiments may be implemented on either the terminal side or the server side of a terminal-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 8:
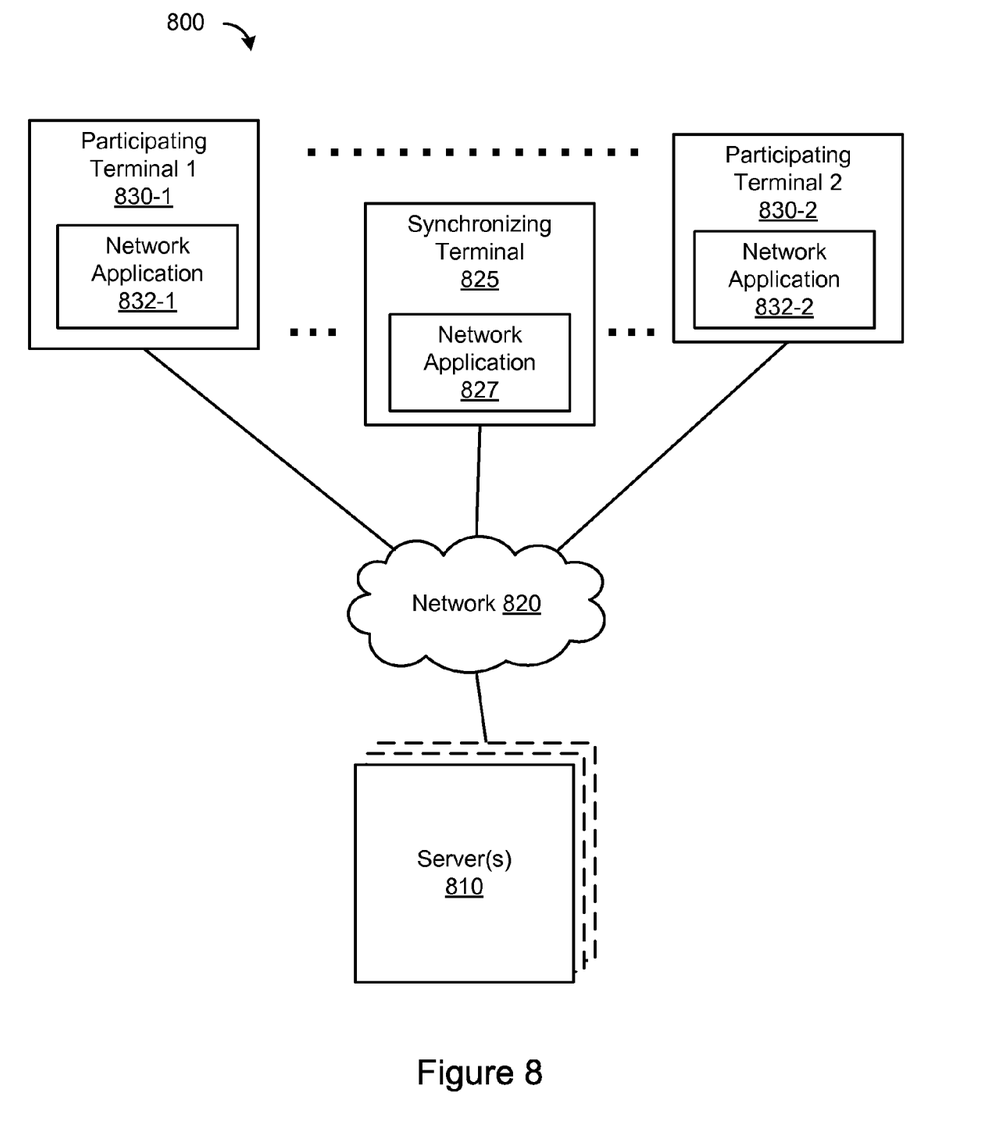
FIG. 8 is a network environment in accordance with some embodiments of the current invention.

FIG. 8 is a network environment in accordance with some embodiments of the current invention. The network environment 800 includes one or more servers 810, one synchronizing terminal 825, and one or more participating terminals (830-1, 830-3). The synchronizing terminal and the participating terminals are connected to the servers via a network 820 (e.g., the Internet). Meanwhile different participating terminal may also be able to communicate with each other via the network 820. For example, as described below, the user input sets generated at the participating terminal 830-1 may be transmitted to the server 810, the synchronizing terminal 825, and/or the participating terminal 830-2. Through the network 810, different entities in the network environment 800 can exchange information with each other. In some embodiments, the network environment 800 supports an on-line game application. Different users participate in the on-line game application from different terminals, wherein one terminal is designated as the synchronizing terminal, the other terminals are designated participating terminals, and the synchronizing terminal synchronizes the operation of the participating terminals. The server 810 interacts with the synchronizing terminal 825 and the participating terminals (830-1, 830-2) and maintains continued synchronization even if the synchronizing terminal withdraws.

Figure 1:
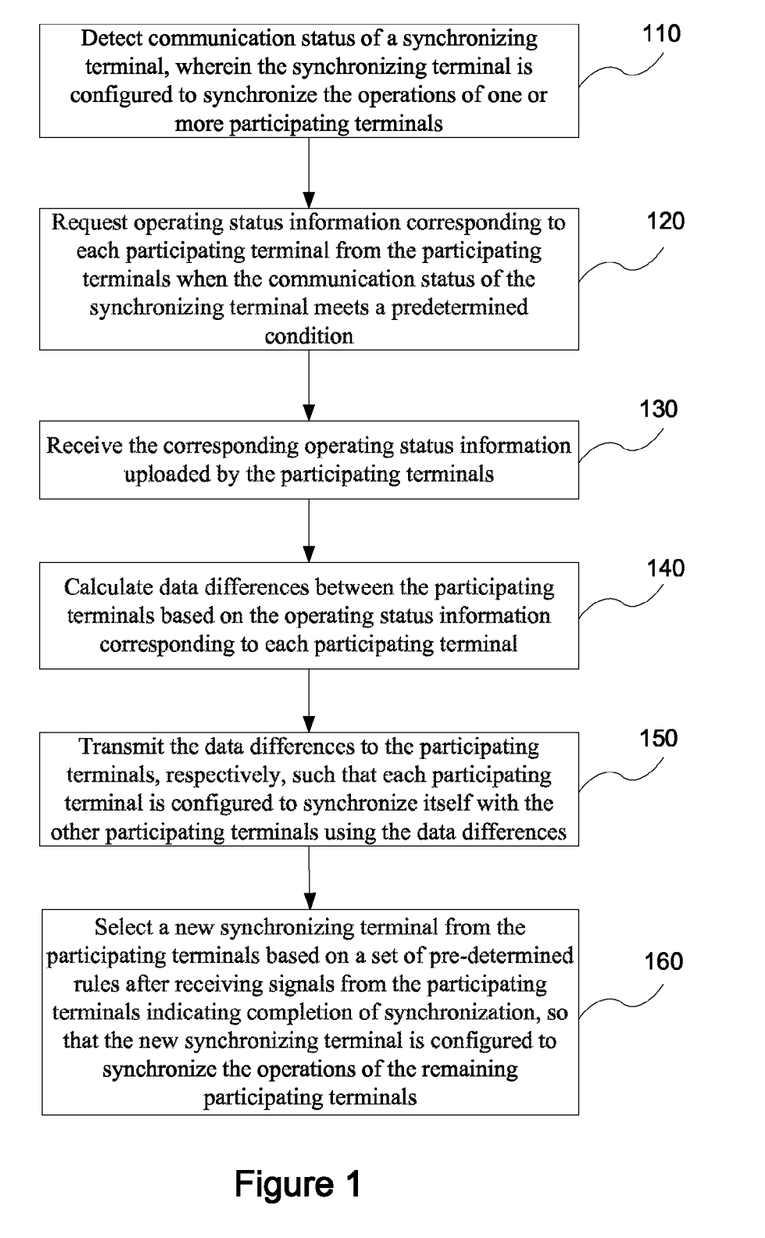
FIG. 1 is a flowchart illustrative of an information management method for continued synchronization in accordance with some embodiments of the current invention.

FIG. 1 is a flowchart illustrative of an information management method for continued synchronization in accordance with some embodiments of the current invention. For illustrative purposes, the current method may be implemented in a network application such as an on-line-game application running at a computer system that includes the server, the synchronizing terminal, and one of the participating terminals shown in FIG. 8.

Figure 2:
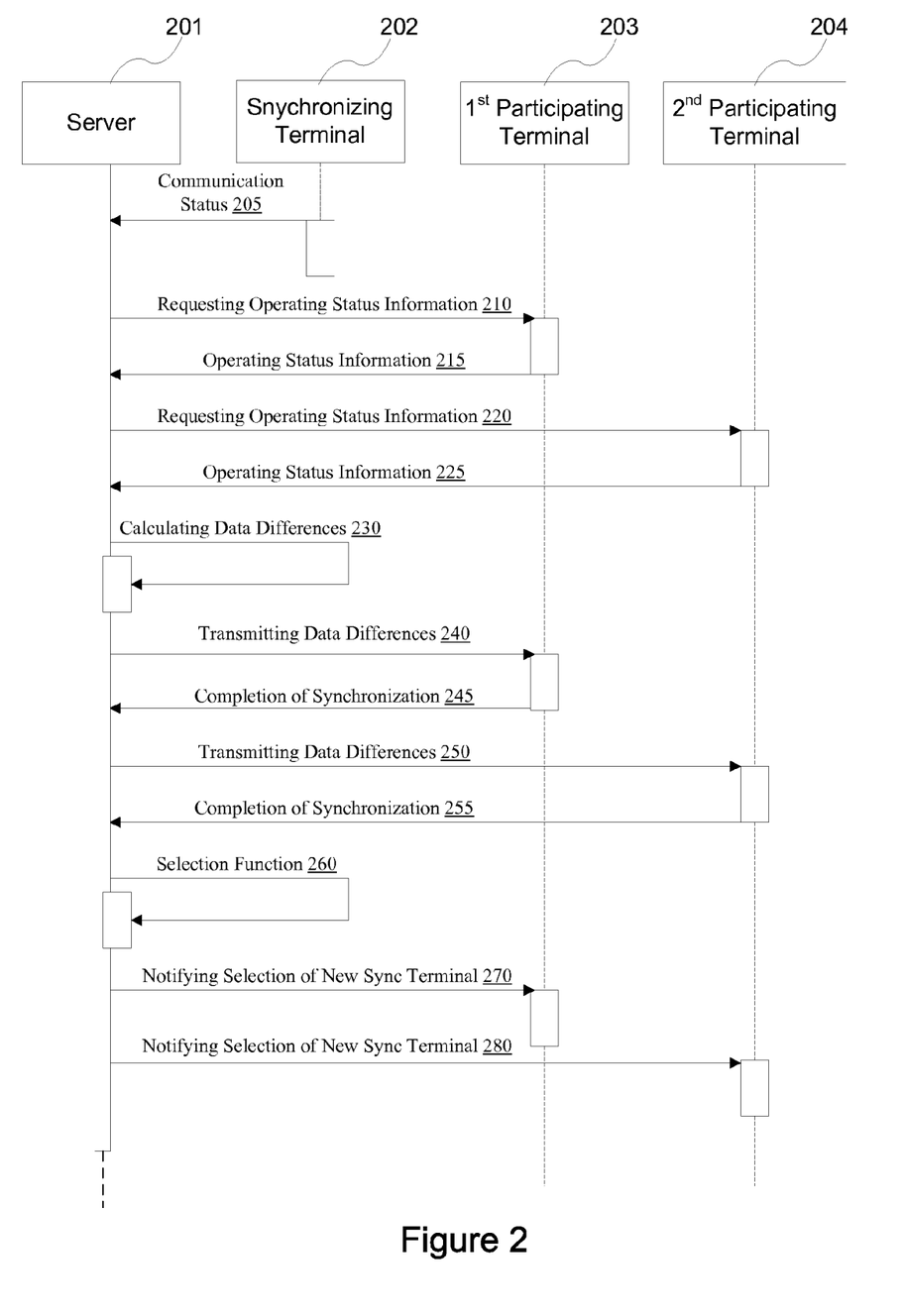
FIG. 2 is a schematic illustration of how a server, a synchronizing terminal, and two participating terminals interact to maintain continued synchronization in accordance with some embodiments of the current invention.

FIG. 2 is a schematic illustration of how a server, a synchronizing terminal, and two participating terminals interact to maintain continued synchronization in accordance with some embodiments of the current invention. The computer system shown in FIG. 2 includes a server 201, a synchronizing terminal 202, a first participating terminal 203, and a second participating terminal 204. However, it should be noted that the number of computing devices implemented according to the current invention may vary based on the specific design and instant scenario of the network application. For example, there may be more than one synchronizing terminal and there may one or any number of participating terminals. In addition, the server and the synchronizing terminal may be the same or different devices.

Referring to FIG. 1, Step 110: the computer system may detect communication status of a synchronizing terminal, wherein the synchronizing terminal is configured to synchronize the operations of one or more participating terminals. Communication status may be any type of status that reflects or specifies how the synchronizing terminal interacts with other computing devices or may be a specific command or request from the synchronizing terminal.

For example, as shown in FIG. 2, the server 201 may detect the communication status 205 of the synchronizing terminal 202. The communication status 205 may be sent actively by the synchronizing terminal 202 and detected by the server 201, or the communication status 205 may be a result of an inquiry sent by the server 201, wherein the result is detected by the server 201. The communication status 205 may be status such as but not limited to: a request from the synchronizing terminal 202, the connection speed and stability between the synchronizing terminal 202 and server 201, the connection speed and stability between the synchronizing terminal 202 and the participating terminals 203 and 204, the time period between the time of detection and the time of the most recent interaction between the synchronizing terminal 202 and the server 201.

Before the detection of the communication status 205, the synchronizing terminal 202 may be configured to synchronize the operation of the participating terminals 203 and 204. The synchronizing terminals 202 may perform functions such as but not limited to: synchronizing the operating logic frames of the synchronizing terminal 202 and the participating terminals 203 and 204; synchronizing the user input set of the synchronizing terminal 202 and the participating terminals 203 and 204; facilitating and monitoring data transmission between the synchronizing terminal 202 and the participating terminals 203 and 204; and facilitating and monitoring data transmission between the server 201 and the participating terminals 203 and 204. The functions of the synchronizing terminal 202 may be temporarily carried out by the server 201 or a participating terminal when the synchronizing terminal 202 withdraws or is withdrawn.

An optional termination step may be taken after the synchronizing terminal 202 withdraws, especially when the communication is a quitting request. The server 201 may send a signal to the synchronizing terminal 202, indicating that the quitting request has been granted and the synchronizing terminal 202 is prevented from further synchronizing the operation of the participating terminals 203 and 204.

Referring to FIG. 1, Step 120: the computer system requests operating status information corresponding to each participating terminal from the participating terminals when the communication status of the synchronizing terminal meets a predetermined condition. The operating status information may include one or more of a number of information items such as but not limited to: operating logic frame value, user input set, rendering frequency, network connection status, processor speed and performance, and memory capacity. The predetermined condition may be any condition that may be used to evaluate the communication status.

For example, as shown in FIG. 2, the server 201 may request operating status information from the participating terminals 203 and 204 in steps 210 and 220, respectively. The participating terminals 203 and 204 may provide the corresponding operating status information 215 and 225 to the server 202.

The server 201 may request operating status information only when the communication status from the synchronizing terminal 202 satisfies a predetermined condition, wherein the predetermined condition may be conditions such as but not limited to: the communication status is that a time period since a last response from the synchronizing terminal to the computer exceeds a threshold; and the communication status is a quitting request indicating that the synchronizing terminal is withdrawing from synchronizing the operation of the one or more participating terminals.

During a P2P session for a network application, a user of the synchronizing terminal may request to withdraw from the network application, and such a communication status in the form of a quitting request then satisfies the predetermined condition. On the other hand, due to various types of reasons such as but not limited to power failure and network connection deficiency, the server may lose contact with the synchronizing server, resulting in a failure of response from the synchronizing terminal to the heartbeat detection routines. When the lack of response exceeds a certain threshold, or when the time period since a last response from the synchronizing terminal exceeds a certain threshold, the communication status satisfies the predetermined condition. Due partly to the broadness of the communication status, the predetermined condition may also vary significantly. For example, in addition to the conditions listed above, the predetermined condition may be that the connection speed (bt/s) between the server and the synchronizing terminal is lower than a threshold.

In some embodiments, the server requests the operating status information from all the participating terminals. As indicated above, the operating status information may include one or more of a number of information items. In particular, the operating status information may include the operating logic frame value and the user input set. The user input set refers to a collection of user input events generated by a user of the corresponding participating terminal. For example, when the user moves the mouse, presses a keystroke, or engages in any operation that affects the network application, a user input event may be generated accordingly and the collection of user input events at a participating terminal in a certain time period may be a user input set. Similarly, the user input events at another participating terminal may be collected as the user input set of that participating terminal. The user input events may affect one or more objects in the network application, e.g. the movement of an object on different graphical interfaces. Ideally, the movement of the same object on different graphical user interfaces at different terminals should happen nearly simultaneously. However, in reality, it may take different amount of time for the same user input set to be displayed or realized in different terminals, causing delayed synchronization and degrading user experience. The operating logic frame value refers to the number of operating logic frames rendered by the participating terminal. The execution of all the codes for a frame is a logic frame and the execution of all the codes may involve the user input set of the participating terminal and the calculations related to the server's framework and the other rendering and calculation related to the participating terminal. By requesting the user input set from the participating terminals, the server may serve temporarily as the synchronizing device for the participating terminals.

Referring to FIG. 1, Step 130: the computer system also receives the corresponding operating status information uploaded by the participating terminals.

For example, as shown in FIG. 2, the server 201 receives the operating status 215 and 225 from the participating terminals 203 and 204, respectively. As indicated above, the operating status information may comprise an operating logic frame value of the corresponding participating terminal and a user input set of the corresponding participating terminal. It should be noted that other information items may also be included in the operating status information to further facility synchronization and coordination of the participating terminals' operations.

Referring to FIG. 1, Step 140: the computer system calculates data differences between the participating terminals based on the operating status information corresponding to each participating terminal.

For example, as shown in FIG. 2, after receiving the operating status information from the participating terminals 203 and 204, the server 201 processes the operating status information, which may include the operating logic frame value and the user input set. The server 201 may determine a most up-to-date operating logic frame value in the operating logic frame values from the participating terminals 203 and 204, respectively; the server 201 may also determine a most up-to-date user input set in the user input sets from the participating terminals 203 and 204. The data differences may include a difference between the user input set of the corresponding participating terminals and the most up-to-date user input set and a difference between the operating logic frame value of the corresponding participating terminal and the most up-to-date operating logic frame value.

For example, suppose the operating status information 215 from the first participating terminal 203 includes an operating logic frame value of 3 and a user input set of a+b+c; suppose the operating status information 225 from the second participating terminal 204 includes an operating logic frame value of 4 and user input set of a+b. Such inconsistencies may be caused by a number of reasons such as different ping values. After receiving the operating status information 215 and 225, the server 201 determines that the most up-to-date operating logic frame value is 4 (from the participating terminal 204) and the most up-to-date user input set is a+b+c (from the participating terminal 203). Then, the data differences are calculated to be [1, 0] for the participating terminal 203 and [0, c] for the participating terminal 204.

An operating logic frame may have a corresponding user input set. However, due to the delay in execution and/or the delay in receiving input, the operating logic frame value and the user input set from the same participating terminal may not be perfectly paired. The synchronization step may bring the operating logic frame and the user input set at all the participating terminals to the same most up-to-date versions.

As indicated above, the operating status information may include other information items so that the data differences may include other differences of the information items. In general, the server determines the most up-to-date information item and calculates the difference of the information item from individual participating terminals and most up-to-date one. The general goal is to allow the participating terminals synchronize to the most up-to-date operating status so that the network application may proceed smoothly and in a synchronized manner. In addition, the number of participating terminals may vary and general principle of synchronization remains the same.

Referring to FIG. 1, Step 150: in some embodiments, the computer system transmits the data differences to the participating terminals, respectively, such that each participating terminal is configured to synchronize itself with the other participating terminals using the data differences.

For example, as shown in FIG. 2, the server 201 transmits the data differences to the participating terminals 203 and 204 in steps 240 and 250, respectively. The corresponding participating terminal is configured to synchronize itself with the other participating terminal using the data differences. In particular, the participating terminals 203 and 204 may use the corresponding synchronizing functions to execute their operating logic frame and user input set based on the data differences transmitted from the server 201. If the particular participating terminal is N frames behind in operating logic frame, the participating terminal renders N frames to proceed to the most up-to-date operating logic frame. If the particular participating terminal is missing user input set c, then the participating terminal executes the user input set c.

After synchronization, the participating terminals 203 and 204 may send a signal to the server 201, indicating that a synchronization has been completed successfully. The server 201 may receive this signal and the next steps are initiated.

Referring to FIG. 1, Step 160: the computer system selects a new synchronizing terminal from the participating terminals based on a set of pre-determined rules after receiving signals from the participating terminals indicating completion of synchronization, so that the new synchronizing terminal is configured to synchronize the operations of the remaining participating terminals.

For example, as shown in FIG. 2, the server 201 uses the selection function 260 to test whether the pre-determined rules are satisfied. The pre-determined rules may be any kind of rules that may determine or facilitate the selection of a new synchronizing terminal. For example, the pre-determined rules may be: (a) a participating terminal ranked first based on hardware performance of all participating terminals is selected as the new synchronizing terminal; (b) a participating terminal ranked first based on connection stability of all participating terminals is selected as the new synchronizing terminal; (c) a participating terminal ranked first on a pre-existing list of all participating terminals is selected as the new synchronizing terminal; (d) a participating terminals is randomly selected from all participating terminals to be the new synchronizing terminal. In particular, the hardware performance may be measured by clock speed and number of processors, and the connection stability may be measured by network delay and fluctuation. It should be noted that the pre-determined rules may vary from the one listed above and may also combine some the rules listed above. The selection function 260 uses the pre-determined rules to make the selection for a new synchronizing terminal from the participating terminals.

After the selection, the server 201 may send out signals to notify the original participating terminals 203 and 204 that a new synchronizing terminal is selected, as shown in steps 270 and 280 of FIG. 2. The notifying process may vary according to the setup and according to which participating terminal is selected. For example, when the participating terminal 203 is selected as the new synchronizing terminal, the server 201 may notify only the remaining participating terminal 204 that the original participating terminal 203 has been chosen as the synchronizing terminal; alternatively, the server 201 may notify both the original participating terminals 203 and 204. The new synchronizing terminal, then, takes up the responsibility to synchronize the synchronizing terminal and the remaining participating terminals. The server 201 is relieved from the responsibility of synchronizing the participating terminals.

When the notification is sent to both participating terminals 203 and 204, the individual participating terminal receives the notification as to whether itself is chosen as the new synchronizing terminal. If the participating terminal finds out that it is chosen as the new synchronizing terminal, the participating terminal may initiate a series of synchronizing processes to coordinate the operation of the remaining participating terminals.

As indicated above, the number and designations of the computing devices in the current system may vary. There may be more than one synchronizing terminal and there maybe one or more participating terminals. The server and the synchronizing terminal may be a single device, wherein a selection of a new synchronizing terminal indicates that the server is no longer involved in the synchronization of the participating terminals.

FIGS. 3-7 and 9-11 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided.

Figure 3:
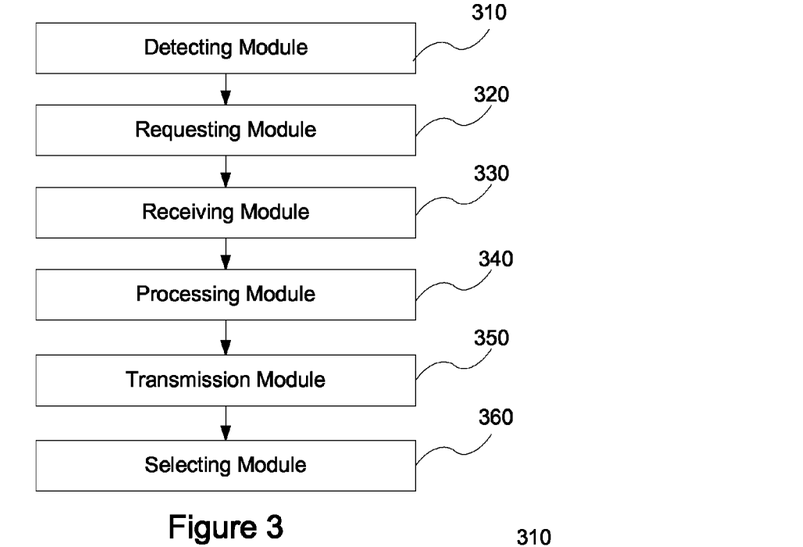
FIG. 3 is a block diagram illustrative of modules in an information management application capable of maintaining continued synchronization in accordance with some embodiments of the current invention.

FIG. 3 is a block diagram illustrative of modules in an information management application capable of maintaining continued synchronization in accordance with some embodiments of the current invention. FIG. 3 shows: a detecting module 310 configured to detect communication status of a synchronizing terminal, wherein the synchronizing terminal is configured to synchronize the operations of one or more participating terminals; a requesting module 320 configured to request operating status information corresponding to each participating terminal from the participating terminals when the communication status of the synchronizing terminal meets a predetermined condition; a receiving module 330 configured to receive the corresponding operating status information uploaded by the participating terminals; a processing module 340 configured to calculate data differences between the participating terminals based on the operating status information corresponding to each participating terminal; a transmission module 350 configured to transmit the data differences to the participating terminals, respectively, such that each participating terminal is configured to synchronize itself with the other participating terminals using the data differences; and a selection module 360 configured to select a new synchronizing terminal from the participating terminals based on a set of pre-determined rules after receiving signals from the participating terminals indicating completion of synchronization, so that the new synchronizing terminal is configured to synchronize the operations of the remaining participating terminals.

As indicated above, the predetermined condition may be: the communication status is that a time period since a last response from the synchronizing terminal to the computer exceeds a threshold, or the communication status is a quitting request indicating that the synchronizing terminal is withdrawing from synchronizing the operation of the one or more participating terminals.

Figure 4:
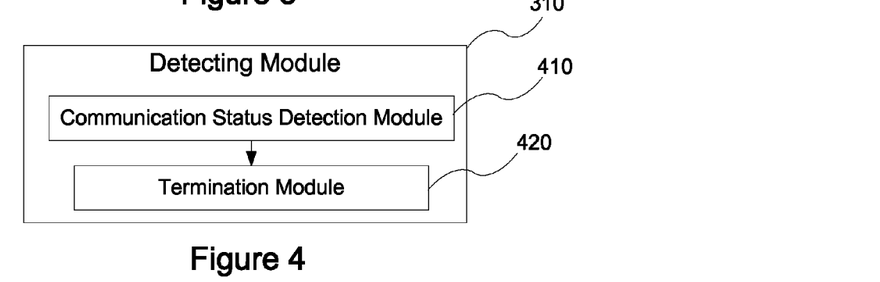
FIG. 4 is a block diagram illustrative of a detecting module in the information management application in accordance with some embodiments of the current invention.

FIG. 4 is a block diagram illustrative of a detecting module 310 in the information management application in accordance with some embodiments of the current invention. The selection module 310 may comprise a communication status detection module 410 configured to detect the communication status of the synchronizing terminal, and a termination module configured to prevent the synchronizing terminal from further synchronizing the operation of the participating terminals. The termination module is an optional structure that is implemented in certain embodiments.

Figure 5:
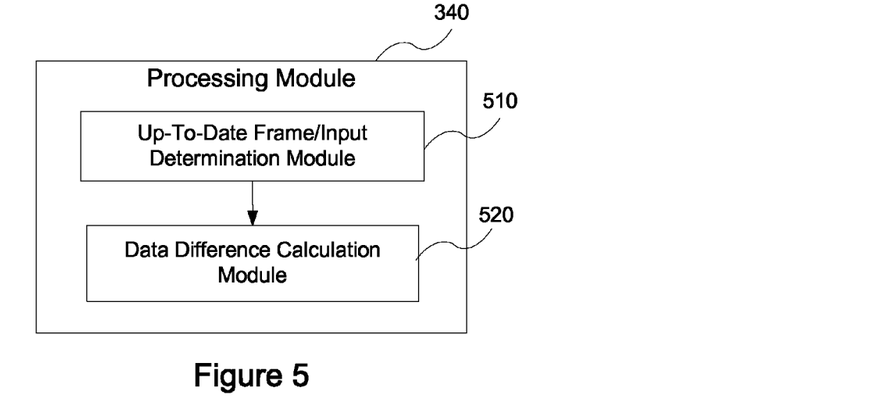
FIG. 5 is a block diagram illustrative of a processing module in the information management application in accordance with some embodiments of the current invention.

FIG. 5 is a block diagram illustrative of a processing module 340 in the information management application in accordance with some embodiments of the current invention. The processing module 340 may comprise an up-to-date frame/input determination module 510 and a data difference calculation module 520.

As indicated above, the operating status information may comprise an operating logic frame value of the corresponding participating terminal and a user input set of the corresponding participating terminal. In particular, the up-to-date frame/input determination module 510 is configured to determine a most up-to-date operating logic frame value in the operating logic frame values from the participating terminals; the up-to-date frame/input determination module 510 is also configured to determine a most up-to-date user input set in the user input sets from the participating terminals; and the data difference calculation module 520 is configured to calculate the data differences including a difference between the user input set of the corresponding participating terminals and the most up-to-date user input set and a difference between the operating logic frame value of the corresponding participating terminal and the most up-to-date operating logic frame value.

Figure 6:
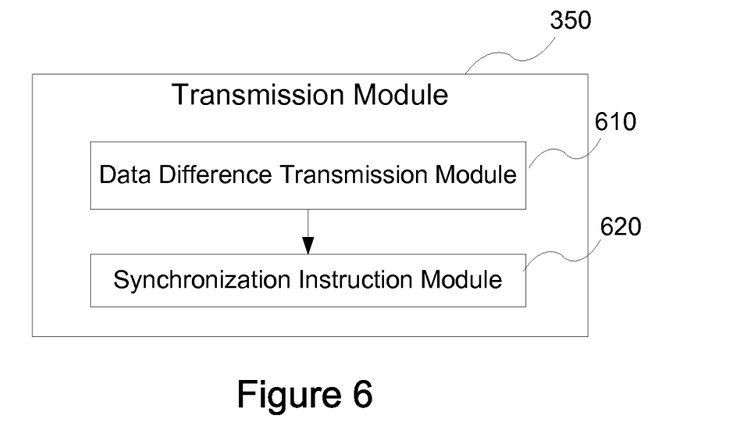
FIG. 6 is a block diagram illustrative of a transmission module in the information management application in accordance with some embodiments of the current invention.

FIG. 6 is a block diagram illustrative of a transmission module 350 in the information management application in accordance with some embodiments of the current invention. The transmission module 350 may include a data difference transmission module 610 configured to transmit the data differences to the participating terminals; and optionally a synchronization instruction module 620 configured to instruct individual participating terminals regarding synchronizing the participating terminal using the data differences.

Figure 7:
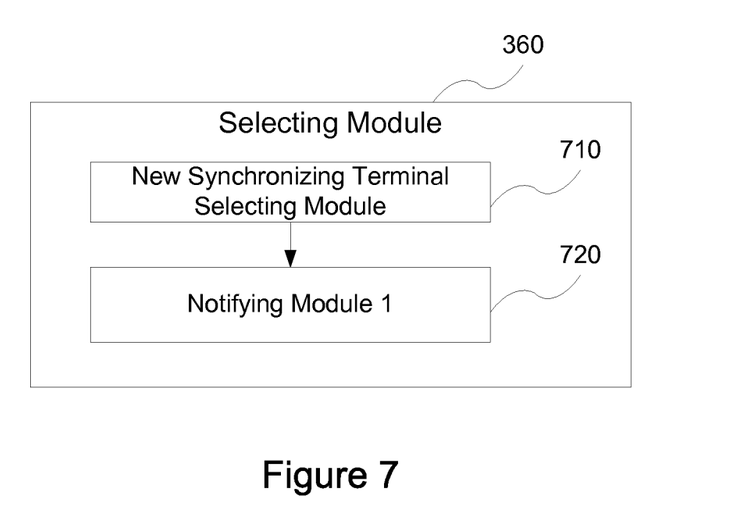
FIG. 7 is a block diagram illustrative of a selecting module in the information management application in accordance with some embodiments of the current invention.

FIG. 7 is a block diagram illustrative of a selecting module 360 in the information management application in accordance with some embodiments of the current invention. The selecting module 360 may comprise a new synchronizing terminal selecting module 710, and a notifying module 720. The new synchronizing terminal selecting module 710 is configured to select the new synchronizing terminal from the participating terminals based on a set of pre-determined rules, and the notifying module 720 is configured to send a notifying signal to all the remaining participating terminals regarding the new synchronizing terminal.

The pre-determined rules may be selected from the group consisting of: (a) a participating terminal ranked first based on hardware performance of all participating terminals is selected as the new synchronizing terminal; (b) a participating terminal ranked first based on connection stability of all participating terminals is selected as the new synchronizing terminal; (c) a participating terminal ranked first on a pre-existing list of all participating terminals is selected as the new synchronizing terminal; and (d) a participating terminals is randomly selected from all participating terminals to be the new synchronizing terminal, wherein the hardware performance is measured by clock speed and number of processors, and the connection stability is measured by network delay and fluctuation.

Figure 9:
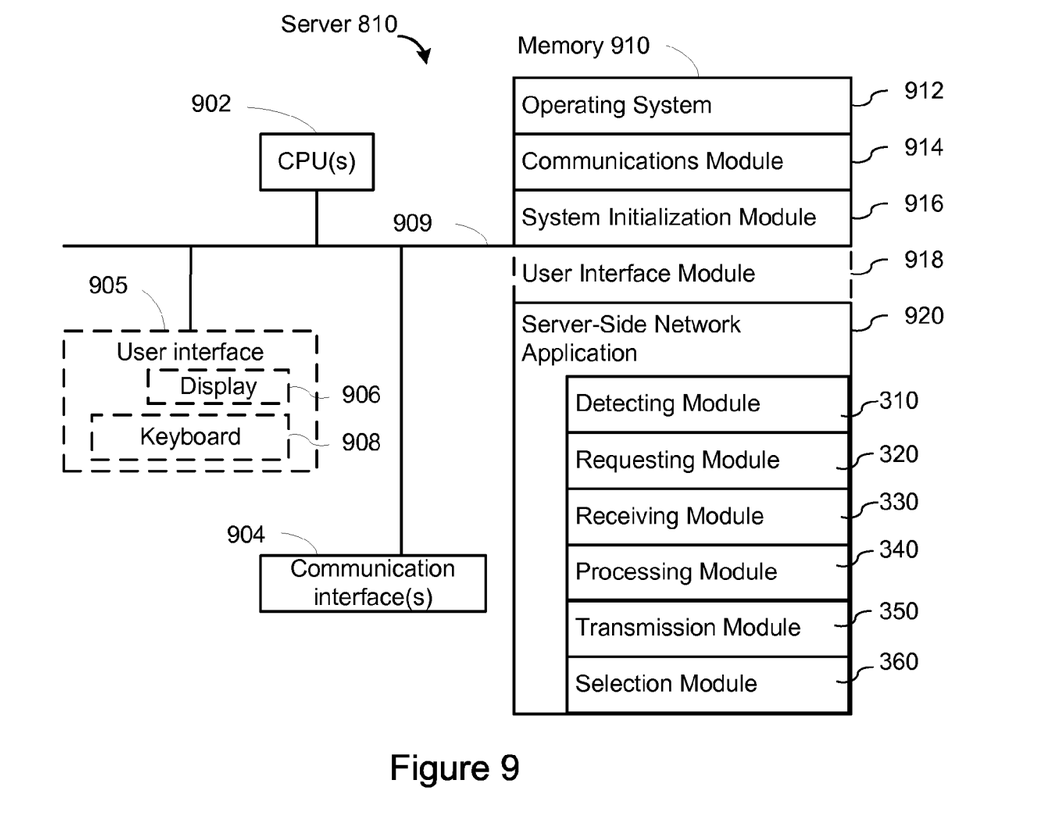
FIG. 9 is a block diagram of a server in accordance with some embodiments of the current invention.

FIG. 9 is a block diagram of an exemplary server in accordance with some embodiments of the current invention. The exemplary server 810 typically includes one or more processing units (CPU's) 902, one or more network or other communications interfaces 904, memory 910, and one or more communication buses 909 for interconnecting these components. The communication buses 909 may include circuitry (sometimes called a chipset) that interconnects and controls communications between system components. The server 810 may include a user input device 905, for instance, a display 906 and a keyboard 908. Memory 910 may include high speed random access memory and may also include non-volatile memory, such as one or more magnetic disk storage devices. Memory 910 may include mass storage that is remotely located from the CPU's 902. In some embodiments, memory 910 stores the following programs, modules and data structures, or a subset or superset thereof:

- an operating system 912 that includes procedures for handling various basic system services and for performing hardware dependent tasks;
- a network communication module 914 that is used for connecting the server 810 to the synchronizing terminal, the participating terminals, and/or other computers via one or more communication networks (wired or wireless), such as the Internet, other wide area networks, local area networks, metropolitan area networks, and so on;
- a system initialization module 916 that initializes other modules and data structures stored in the memory 910 required for the appropriate operation of the server 810;
- a user interface module 918 configured to receive user inputs through the user interface 905; and
- one or more server-side network applications 920, each network application further including a detecting module 310; a requesting module 320; a receiving module; a processing module 340; a transmission module 350; and a selection module 360 as described above in connection with FIG. 3.

Figure 10:
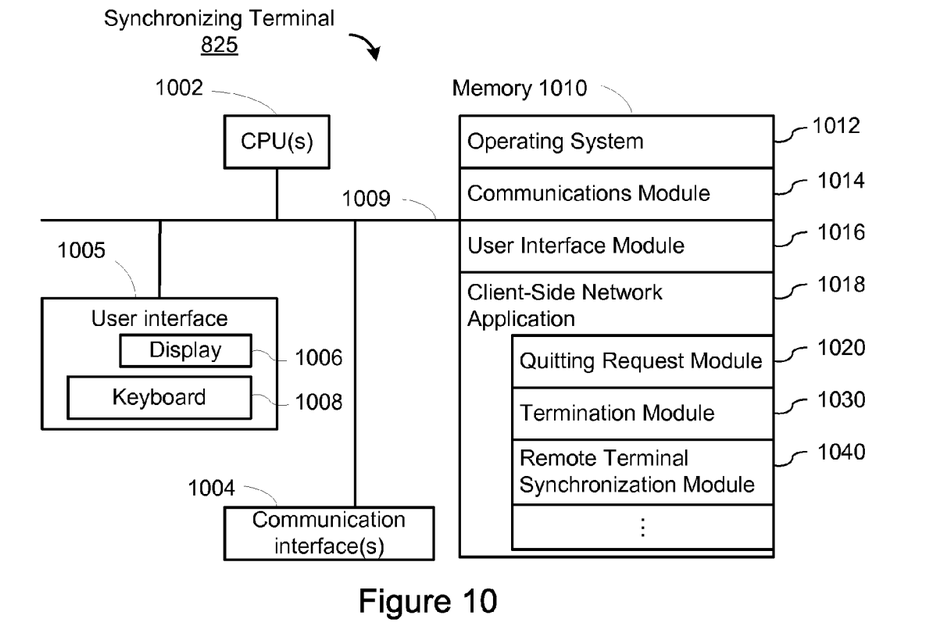
FIG. 10 is a block diagram of a synchronizing terminal in accordance with some embodiments of the current invention.

FIG. 10 is a block diagram of the synchronizing terminal 825 in accordance with some embodiments of the current invention. The exemplary synchronizing terminal 825 typically includes one or more processing units (CPU's) 1002, one or more network or other communications interfaces 1004, memory 1010, and one or more communication buses 1009 for interconnecting these components. The communication buses 1009 may include circuitry (sometimes called a chipset) that interconnects and controls communications between system components. The synchronizing terminal 825 may include a user interface 1005, for instance a display 1006 and a keyboard 1008. When the synchronizing terminal 825 is a smart phone, the user interface 1005 may be a touch screen, suitable for both display and input. Memory 1010 may include high speed random access memory and may also include non-volatile memory, such as one or more magnetic disk storage devices. Memory 1010 may include mass storage that is remotely located from the CPU's 1002. In some embodiments, memory 1010 stores the following programs, modules and data structures, or a subset or superset thereof:

- an operating system 1012 that includes procedures for handling various basic system services and for performing hardware dependent tasks;
- a network communication module 1014 that is used for connecting the synchronizing terminal 825 to the server 810 and/or the participating terminals via one or more communication networks (wired or wireless), such as the Internet, other wide area networks, local area networks, metropolitan area networks, and so on;
- an optional user interface module 1016 configured to receive user inputs through the user interface 1005; and
- one or more terminal-side network applications 1018, each network application further including a quitting request module 1020 configured to send a quitting request in the form of a communication status to the server; a termination module 1030 configured to stop the function of the synchronizing terminal 825 from synchronizing the participating terminals; and a remote terminal synchronization module 1040 configured to synchronize the operation of the participating terminals when the synchronizing terminal 820 has not withdrawn from such functions.

Figure 11:
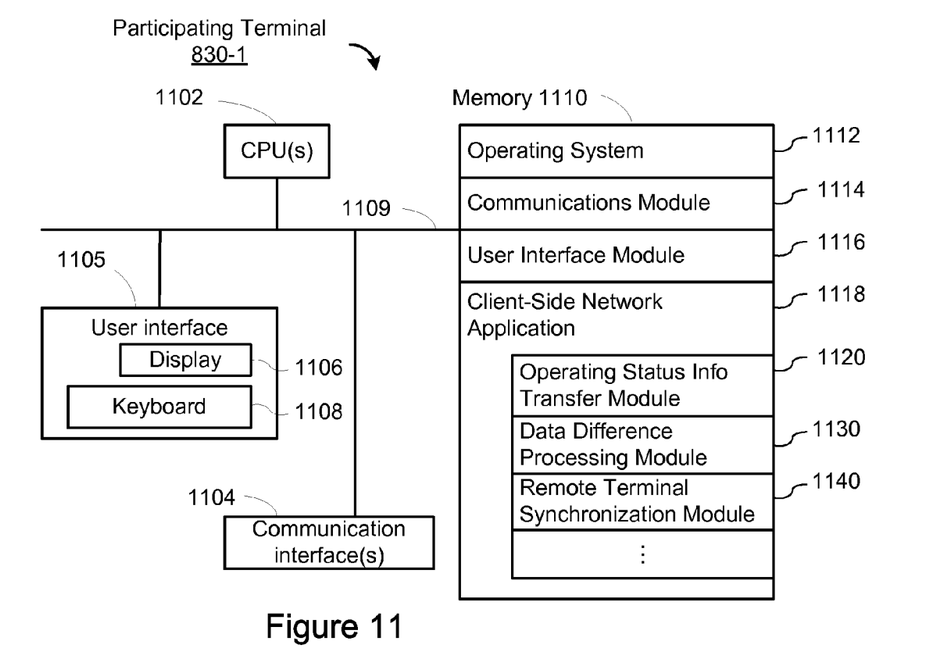
FIG. 11 is a block diagram of a participating terminal in accordance with some embodiments of the current invention.

FIG. 11 is a block diagram of the participating terminal 830-1 in accordance with some embodiments of the current invention. The exemplary participating terminal 830-1 typically includes one or more processing units (CPU's) 1102, one or more network or other communications interfaces 1104, memory 1110, and one or more communication buses 1109 for interconnecting these components. The communication buses 1109 may include circuitry (sometimes called a chipset) that interconnects and controls communications between system components. The participating terminal 830-1 may include a user interface 1105, for instance a display 1106 and a keyboard 1108. When the participating terminal 830-1 is a smart phone, the user interface 1105 may be a touch screen, suitable for both display and input. Memory 1110 may include high speed random access memory and may also include non-volatile memory, such as one or more magnetic disk storage devices. Memory 1110 may include mass storage that is remotely located from the CPU's 1102. In some embodiments, memory 1110 stores the following programs, modules and data structures, or a subset or superset thereof:

- an operating system 1112 that includes procedures for handling various basic system services and for performing hardware dependent tasks;
- a network communication module 1114 that is used for connecting the synchronizing terminal 825 to the server 810 and/or the participating terminals via one or more communication networks (wired or wireless), such as the Internet, other wide area networks, local area networks, metropolitan area networks, and so on;
- an optional user interface module 1116 configured to receive user inputs through the user interface 1105; and
- one or more terminal-side network applications 1118, each network application further including a operating status information transfer module 1120 configured to send the operating status information to the server 810; a data difference processing module configured to synchronize the participating terminals 830-1 based on the data differences; and a remote terminal synchronization module 1140 configured to synchronize the operation of the participating terminals when the server select the participating terminal 830-1 as the new synchronizing terminal.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for information management, comprising:
   at a computer having one or more processors and memory storing programs executed by the one or more processors,
   detecting a communication status of a synchronizing terminal, wherein the synchronizing terminal is configured to synchronize operations of one or more participating terminals;
   requesting operating status information corresponding to each participating terminal from the participating terminals when the communication status of the synchronizing terminal meets a predetermined condition;
   receiving the corresponding operating status information uploaded by the participating terminals;
   calculating data differences between the participating terminals based on the operating status information corresponding to each participating terminal;
   transmitting the data differences to the participating terminals, respectively, such that each participating terminal is configured to synchronize itself with the other participating terminals using the data differences; and
   selecting a new synchronizing terminal from the participating terminals based on a set of pre-determined rules after receiving signals from the participating terminals indicating completion of synchronization, so that the new synchronizing terminal is configured to synchronize the operations of the remaining participating terminals.

2. The computer-implemented method of claim 1, wherein:
   the predetermined condition comprises:
   the communication status is that a time period since a last response from the synchronizing terminal to the computer exceeds a threshold.

3. The computer-implemented method of claim 1, wherein:
   the predetermined condition comprises:
   the communication status is a quitting request indicating that the synchronizing terminal is withdrawing from synchronizing the operations of the one or more participating terminals.

4. The computer-implemented method of claim 1, wherein:
   the operating status information comprises an operating logic frame value of the corresponding participating terminal and a user input set of the corresponding participating terminal.

5. The computer-implemented method of claim 4, further comprising:
   determining a most up-to-date operating logic frame value in the operating logic frame values from the participating terminals; and
   determining a most up-to-date user input set in the user input sets from the participating terminals; wherein
   the data differences include a difference between the user input set of the corresponding participating terminals and the most up-to-date user input set and a difference between the operating logic frame value of the corresponding participating terminal and the most up-to-date operating logic frame value.

6. The computer-implemented method of claim 5, wherein each participating terminal is configured to synchronize itself with the other participating terminals by adjusting its user input set to the most up-to-date user input set and rendering its operating logic frame to the most up-to-date operating logic frame values based on the data differences.

7. The computer-implemented method of claim 1, wherein the pre-determined rules include at least one rule selected from the group consisting of:
   (a) a participating terminal ranked first based on hardware performance of all participating terminals is selected as the new synchronizing terminal;
   (b) a participating terminal ranked first based on connection stability of all participating terminals is selected as the new synchronizing terminal;
   (c) a participating terminal ranked first on a pre-existing list of all participating terminals is selected as the new synchronizing terminal; and
   (d) a participating terminal is randomly selected from all participating terminals to be the new synchronizing terminal.

8. The computer-implemented method of claim 7, wherein the hardware performance is measured by clock speed and number of processors, and
   the connection stability is measured by network delay and fluctuation.

9. The computer-implemented method of claim 1, further comprising:
   sending a notifying signal to all the remaining participating terminals regarding the new synchronizing terminal.

10. A computer system, comprising:
    one or more processors;
    memory storing one or more programs to be executed by the one or more processors, the one or more programs including instructions for:
    detecting a communication status of a synchronizing terminal, wherein the synchronizing terminal is configured to synchronize operations of one or more participating terminals;
    requesting operating status information corresponding to each participating terminal from the participating terminals when the communication status of the synchronizing terminal meets a predetermined condition;
    receiving the corresponding operating status information uploaded by the participating terminals;
    calculating data differences between the participating terminals based on the operating status information corresponding to each participating terminal;
    transmitting the data differences to the participating terminals, respectively, such that each participating terminal is configured to synchronize itself with the other participating terminals using the data differences; and
    selecting a new synchronizing terminal from the participating terminals based on a set of pre-determined rules after receiving signals from the participating terminals indicating completion of synchronization, so that the new synchronizing terminal is configured to synchronize the operations of the remaining participating terminals.

11. The computer system of claim 10, wherein
    the predetermined condition is selected from the group consisting of:
    the communication status is that a time period since a last response from the synchronizing terminal to the computer exceeds a threshold; and
    the communication status is a quitting request indicating that the synchronizing terminal is withdrawing from synchronizing the operations of the one or more participating terminals.

12. The computer system of claim 10, wherein:
the operating status information comprises an operating logic frame value of the corresponding participating terminal and a user input set of the corresponding participating terminal.

13. The computer system of claim 12, wherein calculating the data differences between the participating terminals includes:
determining a most up-to-date operating logic frame value in the operating logic frame values from the participating terminals;
determining a most up-to-date user input set in the user input sets from the participating terminals; wherein
the data differences include a difference between the user input set of the corresponding participating terminals and the most up-to-date user input set and a difference between the operating logic frame value of the corresponding participating terminal and the most up-to-date operating logic frame value.

14. The computer system of claim 13, wherein:
each participating terminal is configured to synchronize itself with the other participating terminals by adjusting its user input set to the most up-to-date user input set and rendering its operating logic frame to the most up-to-date operating logic frame values.

15. The computer system of claim 10, wherein
the pre-determined rules include at least one rule selected from the group consisting of:
(a) a participating terminal ranked first based on hardware performance of all participating terminals is selected as the new synchronizing terminal;
(b) a participating terminal ranked first based on connection stability of all participating terminals is selected as the new synchronizing terminal;
(c) a participating terminal ranked first on a pre-existing list of all participating terminals is selected as the new synchronizing terminal; and
(d) a participating terminal is randomly selected from all participating terminals to be the new synchronizing terminal.

16. The computer system of claim 15, wherein
the hardware performance is measured by clock speed and number of processors, and
the connection stability is measured by network delay and fluctuation.

17. The computer system of claim 10, wherein the one or more programs further include instructions for sending a notifying signal to all the remaining participating terminals regarding the new synchronizing terminal.

18. A non-transitory computer readable storage medium storing instructions, which, when executed by a computer system, cause the computer system to:
detect a communication status of a synchronizing terminal, wherein the synchronizing terminal is configured to synchronize operations of one or more participating terminals;
request operating status information corresponding to each participating terminal from the participating terminals when the communication status of the synchronizing terminal meets a predetermined condition;
receive the corresponding operating status information uploaded by the participating terminals;
calculate data differences between the participating terminals based on the operating status information corresponding to each participating terminal;
transmit the data differences to the participating terminals, respectively, such that each participating terminal is configured to synchronize itself with the other participating terminals using the data differences; and
select a new synchronizing terminal from the participating terminals based on a set of pre-determined rules after receiving signals from the participating terminals indicating completion of synchronization, so that the new synchronizing terminal is configured to synchronize the operations of the remaining participating terminals.

19. The non-transitory computer readable storage medium of claim 18, wherein
the predetermined condition is selected from the group consisting of:
the communication status is that a time period since a last response from the synchronizing terminal to the computer exceeds a threshold; and
the communication status is a quitting request indicating that the synchronizing terminal is withdrawing from synchronizing the operations of the one or more participating terminals.

20. The non-transitory computer readable storage medium of claim 18, wherein:
the operating status information comprises an operating logic frame value of the corresponding participating terminal and a user input set of the corresponding participating terminal; and
the instructions include instructions for:
determining a most up-to-date operating logic frame value in the operating logic frame values from the participating terminals, and
determining a most up-to-date user input set in the user input sets from the participating terminals,
calculating a difference between the user input set of the corresponding participating terminals and the most up-to-date user input set and a difference between the operating logic frame value of the corresponding participating terminal and the most up-to-date operating logic frame value.

21. The non-transitory computer readable storage medium of claim 20, wherein
each participating terminal is configured to synchronize itself with the other participating terminals by adjusting its user input set to the most up-to-date user input set and rendering its operating logic frame values to the most up-to-date operating logic frame values based on the data differences.

22. The non-transitory computer readable storage medium of claim 18, wherein
the pre-determined rules include at least one rule selected from the group consisting of:
(a) a participating terminal ranked first based on hardware performance of all participating terminals is selected as the new synchronizing terminal;
(b) a participating terminal ranked first based on connection stability of all participating terminals is selected as the new synchronizing terminal;
(c) a participating terminal ranked first on a pre-existing list of all participating terminals is selected as the new synchronizing terminal; and
(d) a participating terminal is randomly selected from all participating terminals to be the new synchronizing terminal.

23. The non-transitory computer readable storage medium of claim 22, wherein
the hardware performance is measured by clock speed and number of processors, and
the connection stability is measured by network delay and fluctuation.

24. The non-transitory computer readable storage medium of claim 18, wherein the instructions further comprise instructions for:
   sending a notifying signal to all the remaining participating terminals regarding the new synchronizing terminal.

* * * * *